2,754,318
Patented July 10, 1956

2,754,318

METHOD OF MAKING MIXED FLUORINATED PHOSPHATE ESTERS AND RESULTING NEW PHOSPHATES

James C. Conly, Santa Monica, Calif., assignor to Douglas Aircraft Company, Inc., Santa Monica, Calif.

No Drawing. Application March 10, 1951, Serial No. 215,019

19 Claims. (Cl. 260—461)

This invention relates to a new method for preparing mixed fluorinated esters of orthophosphoric acid having at least one alkyl or one alkoxyalkyl substituent and to the resulting new fluorinated phosphate esters as new chemical compounds, and relates more particularly to a commercially feasible or practicable process for the production of such fluorinated phosphate esters and to the resulting new fluorinated phosphate esters as new chemical compounds of the general formula.

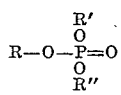

wherein R represents an alkyl radical terminating with a $CH_2$ group, that is, derived from a primary alcohol, and containing from 1 to 10 carbon atoms, preferably from 4 to 8; or an alkoxyalkyl radical derived from a primary alcohol having from 3 to 10 carbon atoms and in which the alkyl portion has at least 2 carbon atoms; R' represents a fluorinated alkyl radical having from 2 to 10 carbon atoms and having a $CF_2$ or $CF_3$ group, that is, having a fluorinated carbon atom with at least 2 fluorine atoms, bonded to the carbon atom connected to an oxygen of the phosphate radical and the carbon atom bonded to the oxygen of the phosphate radical is bonded, in addition to the bond to this oxygen, only to atoms which are members of the group consisting of hydrogen and carbon; or a fluorinated alkoxyalkyl radical containing from 3 to 10 carbon atoms with at least 2 carbon atoms in the alkyl portion thereof and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon; and R" represents an alkyl radical terminating with a $CH_2$ group, that is, derived from a primary alcohol, and containing from 4 to 10 carbon atoms; an alkoxyalkyl radical derived from a primary alcohol having from 3 to 10 carbon atoms and in which the alkyl portion has at least 2 carbon atoms; a fluorinated alkyl radical having from 2 to 10 carbon atoms and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon; or a fluorinated alkoxyalkyl radical containing from 3 to 10 carbon atoms with at least 2 carbon atoms in the alkyl portion thereof and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon.

My invention more particularly relates to the production of such mixed fluorinated phosphate esters having at least one alkyl substituent and at least one fluorinated alkyl substituent, that is, a mono-alkyl di-fluoralkyl phosphate or a di-alkyl mono-fluoroalkyl phosphate.

The compounds of this invention prepared by the novel process of this invention are generally nearly colorless liquids having mild pleasant odors. These esters have exceptional utility as flexibilizing plasticizers for fluorinated polymers, as non-flammable hydraulic fluids, or as stable liquid heat-transfer agents, in addition to many other uses based on their low viscosity at low temperatures, high stability and extraordinary fire resistance.

In general, in accordance with the method of my invention, I first react an aliphatic alcohol with phosphorous oxychloride ($POCl_3$) to substitute an alkoxy group for one of the chlorine atoms of the phosphorous oxychloride or substitute two alkoxy groups for two of the chlorine atoms of the phosphoryl chloride to make, respectively, either the monoalkyl phosphoryl dichloride or the dialkyl phosphoryl chloride, and thereafter I substitute the remaining chlorine in either case by reacting the alkyl phosphoryl chloride, that is, either the dialkyl phosphoryl monochloride or the alkyl phosphoryl dichloride, with an aqueous solution of an alkali metal salt of a fluorinated alcohol having a fluorinated carbon atom with at least two fluorine atoms bonded to the carbon atom to be connected to the phosphate radical, that is, the carbinol carbon atom, and the carbinol carbon atom, in addition to being bonded to oxygen, is bonded only to atoms which are members of the group consisting of hydrogen and carbon. It is an especially significant discovery in accordance with my invention that this can be done and that new chemical compounds are thereby produced.

The following examples will illustrate my invention but are not intended to limit it to the exact methods and materials indicated:

Example 1

153.5 grams of $POCl_3$ are cooled to 10–15° C. in a closed glass vessel and 102 grams of hexyl alcohol are added slowly with stirring at such a rate that the temperature of the reaction mass remains at about 15° C. At the end of the addition, stirring is continued for about one-half hour at 15° C., and then the temperature is allowed to rise slowly to 25° C. During the reaction hydrogen chloride gas is evolved and may be removed by application of a vacuum such that the $POCl_3$ does not boil away. When the reaction is complete, hexyl phosphoryl dichloride is added slowly at such a rate that the temperature does not rise above 10° C., with stirring, to a 10% excess, of a 25% solution of sodium 2,2,3,3,4,4,4-heptafluorobutyl alcoholate in water which has been cooled to 0–5° C. After addition is complete, the reaction mixture is stirred for about an hour and then allowed to warm to room temperature, with stirring. The ester layer is separated from the aqueous layer (which was extracted once with ethyl ether to remove any residual ester), the ester layer washed once or twice with 2% NaOH solution and then with water. The quite pure hexyl di(2,2,3,3,4,4,4-heptafluorobutyl) phosphate ester was distilled, since in this case the boiling point is sufficiently low (100° C. at 0.5 mm./Hg). The yield of the distilled ester was 91%. Unreacted fluoralcohol was recovered from the alkaline water layers and used in later cycles.

Example 2

Two mols of distilled n-butyl alcohol were added dropwise to one mol of $POCl_3$ at 25–35° C. The temperature was slowly brought up to 65° C. and the pressure slowly reduced to 50 mm./Hg to remove hydrogen chloride. Without further purification this mixture was added dropwise at 0–5° C. to a saturated solution of one mol of 2,2,3,3,4,4,4-heptafluorobutyl alcohol in one mol of sodium hydroxide with good stirring. The mixture was allowed to rise in temperature to 25° C. with continued stirring. The resulting mixture was washed, dried and distilled to separate out the desired water insoluble di(n-butyl) 2,2,3,3,4,4,4-heptafluorobutyl phosphate ester. The boiling point of this phosphate was 92–100° C. at 1 mm./Hg.

*Example 3*

One mol of distilled dry n-butanol (72 grams) was added slowly to one mol of phosphorous oxychloride at 15° C. with stirring and cooling over a period of one-half hour. At the end of this time the temperature was slowly raised to 65° C. for two hours, and the pressure reduced gradually to 50 mm. of mercury to remove hydrogen chloride. The resultant n-butyl phosphoryl dichloride was added slowly with stirring to an aqueous solution of 400 grams of 2,2,3,3,4,4,4-heptafluorobutyl alcohol in two liters of water containing 80 grams of sodium hydroxide maintained below 5° C. When addition was complete the mixture was allowed to warm slowly to room temperature, the oil phase was separated washed with water, dried and distilled. n-Butyl di-2,2,3,3,4,4,4-heptafluorobutyl phosphate, B. P. 80°–85° at 1 mm./Hg pressure, was obtained in good yield as a water-white, low-viscosity liquid.

Although the exact concentrations and temperatures used are not critical, it is preferred that the temperature in general be kept fairly low, that is, below 25° C., for the first step, although after the reaction is almost complete the temperature may be raised as high as 50° C. to remove the HCl formed. In the second step, the higher the temperature the poorer the yields, and preferred temperatures are as low as −5° C., although reaction is slower at this temperature than at the 5° C. in the example. Concentrated solutions of sodium alcoholate can be used, up to saturation, although stirring becomes difficult due to the viscosity of highly concentrated solutions.

In accordance with my invention the alkanols and alkyl radicals particularly include butyl, isobutyl, amyl, isoamyl, hexyl, heptyl, octyl, isooctyl, 2-ethylhexyl, nonyl, 3,3,5, trimethylhexyl and decyl. The alkoxyalkyl radicals may be those derived from methyl ether of ethylene glycol, ethyl ether of ethylene glycol, propyl ether of ethylene glycol, butyl ether of ethylene glycol, methyl ether of diethylene glycol, ethyl ether of diethylene glycol, propyl ether of diethylene glycol, butyl ether of diethylene glycol, methyl ether of propylene glycol, ethyl ether of propylene glycol, propyl ether of propylene glycol, and butyl ether of propylene glycol.

The fluorinated alcohols from which the fluorinated alkoxy radicals for my invention may be derived may be represented by the formula $$C_nF_{2n+1-m}H_mCF_2\overset{R}{\underset{R'}{C}}-OH$$

in which $m$ is less than or equal to $2n+1$ and $n$ may have any value from 0 to 4, and R and R' may be hydrogen or alkyl radicals. These particularly include those represented by the following formulas:

$CF_3CH_2OH$
$CF_3CF_2CH_2OH$
$CF_3(CF_2)_2CH_2OH$
$CF_3(CF_2)_3CH_2OH$
$CF_3(CF_2)_4CH_2OH$
$CF_3(CF_2)_5CH_2OH$
$CF_3(CF_2)_6CH_2OH$
$CF_3CHOHC_2H_5$
$CF_3CHOHC_3H_7$
$CF_3CHOHC_4H_9$
$CF_3CHOHC_5H_{11}$
$CF_3CHOHC_6H_{13}$
$CF_3CHOHC_7H_{15}$
$CF_3CHOHC_8H_{17}$
$CF_3CF_2CHOHC_2H_5$
$CF_3CF_2CHOHC_3H_7$
$CF_3CF_2CHOHC_4H_9$
$CF_3CF_2CHOHC_5H_{11}$
$CF_3CF_2CHOHC_6H_{13}$
$CF_3CF_2CHOHC_7H_{15}$
$CF_3CF_2CHOHC_8H_{17}$
$CF_3(CF_2)_2CHOHC_2H_5$
$CF_3(CF_2)_2CHOHC_3H_7$
$CF_3(CF_2)_2CHOHC_4H_9$
$CF_3(CF_2)_2CHOHC_5H_{11}$
$CF_3(CF_2)_2CHOHC_6H_{13}$
$CF_3(CF_2)_2CHOHC_7H_{15}$
$CF_3(CF_2)_2CHOHC_8H_{17}$
$CF_3(CF_2)_3CHOHC_2H_5$
$CF_3(CF_2)_3CHOHC_3H_7$
$CF_3(CF_2)_3CHOHC_4H_9$
$CF_3(CF_2)_3CHOHC_5H_{11}$
$CF_3(CF_2)_3CHOHC_6H_{13}$
$CF_3(CF_2)_3CHOHC_7H_{15}$
$CF_3(CF_2)_3CHOHC_8H_{17}$
$CF_3(CF_2)_4CHOHC_2H_5$
$CF_3(CF_2)_4CHOHC_3H_7$
$CF_3(CF_2)_4CHOHC_4H_9$
$CF_3(CF_2)_4CHOHC_5H_{11}$
$CF_3(CF_2)_4CHOHC_6H_{13}$
$CF_3(CF_2)_4CHOHC_7H_{15}$
$CF_3(CF_2)_4CHOHC_8H_{17}$
$CF_3(CF_2)_5CHOHC_2H_5$
$CF_3(CF_2)_5CHOHC_3H_7$
$CF_3(CF_2)_5CHOHC_4H_9$
$CF_3(CF_2)_5CHOHC_5H_{11}$
$CF_3(CF_2)_5CHOHC_6H_{13}$
$CF_3(CF_2)_5CHOHC_7H_{15}$
$CF_3(CF_2)_5CHOHC_8H_{17}$
$CF_3C(CH_3)_2OH$
$CF_3C(C_2H_5)_2OH$
$CF_3C(C_3H_7)_2OH$
$CF_3C(C_4H_9)_2OH$

The fluorinated alcohols may be primary, secondary or tertiary. The fluorinated alkoxyalkanols particularly include those represented by the following formulas:

$CF_2H_5OCH_2CF_2CF_2CH_2OH$
$C_3H_7OCH_2CF_2CF_2CH_2OH$
$C_4H_9OCH_2CF_2CF_2CH_2OH$
$C_5H_{11}OCH_2CF_2CF_2CH_2OH$
$C_6H_{13}OCH_2CF_2CF_2CH_2OH$
$C_2H_5OCH_2CF_2CF_2CF_2CH_2OH$
$C_3H_7OCH_2CF_2CF_2CF_2CH_2OH$
$C_4H_9OCH_2CF_2CF_2CF_2CH_2OH$
$C_5H_{11}OCH_2CF_2CF_2CF_2CH_2OH$
$C_6H_{13}OCH_2CF_2CF_2CF_2CH_2OH$
$C_2H_5OCH_2(CF_2)_4CH_2OH$
$C_3H_7OCH_2(CF_2)_4CH_2OH$
$C_4H_9OCH_2(CF_2)_4CH_2OH$
$C_5H_{11}OCH_2(CF_2)_4CH_2OH$
$C_6H_{13}OCH_2(CF_2)_4CH_2OH$

The foregoing describes my invention in its preferred aspects, and illustrates my invention by way of specific embodiments and specific examples, but alterations and modifications may be made thereof without departing from the invention herein disclosed and claimed.

Having described my invention, I claim:

1. The method of making a mixed fluorinated phosphate ester having one substituent selected from the group consisting of an alkyl radical terminating in a $CH_2$ group and an alkoxyalkyl radical terminating in a $CH_2$ group and having at least two carbon atoms in the alkyl portion thereof, one substituent selected from the group consisting of a fluorinated alkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and a fluorinated alkoxyalkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and having at least two carbon atoms in the alkyl portion thereof, and the other substituent selected from the group consisting of an alkyl radical terminating in a CH₂ group, an alkoxyalkyl radical terminating in a CH₂ group and having at least two carbon atoms in the alkyl portion thereof, a fluorinated alkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and a fluorinated alkoxyalkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and having at least two carbon atoms in the alkyl portion thereof, which comprises reacting a member of the group consisting of a monoalkyl phosphoryl dichloride in which the alkyl radical terminates in a CH₂ group, a monoalkoxyalkyl phosphoryl dichloride in which the alkoxyalkyl radical terminates in a CH₂ group and has at least two carbon atoms in the alkyl portion thereof, a dialkyl phosphoryl chloride in which the alkyl radicals terminate in a CH₂ group, and a dialkoxyalkyl phosphoryl chloride in which the alkoxyalkyl radicals terminate in a CH₂ group and have at least two carbon atoms in the alkyl portion thereof with an aqueous solution of an alkali metal salt of a fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon selected from the group consisting of a fluorinated alkanol and a fluorinated alkoxyalkanol.

2. The method as defined in claim 1 in which the alkali metal salt of a fluorinated alcohol is a sodium alcoholate.

3. The method of making a mixed fluorinated tri-alkyl phosphate having at least one non-fluorinated alkyl group and at least one fluorinated alkyl group which comprises reacting an alkyl phosphoryl chloride with an aqueous solution of an alkali metal salt of a fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon and thereby substituting fluorinated alkoxy for the chlorine of the alkyl phosphoryl chloride.

4. The method as defined in claim 3 in which the alkali metal salt of a fluorinated alcohol is a sodium alcoholate.

5. The method of making a mono-fluoroalkyl dialkyl phosphate which comprises reacting dialkyl phosphoryl chloride with an aqueous solution of an alkali metal salt of a fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon and thereby substituting fluorinated alkoxy for the chlorine of the dialkyl phosphoryl chloride.

6. The method as defined in claim 5 in which the alkali metal salt of a fluorinated alcohol is a sodium alcoholate.

7. The method of making a monoalkyl di-fluoroalkyl phosphate which comprises reacting alkyl phosphoryl dichloride with an aqueous solution of an alkali metal salt of a fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon and thereby substituting a fluorinated alkoxy radical for each of the two chlorine atoms of the alkyl phosphoryl dichloride.

8. The method as defined in claim 7 in which the alkali metal salt of a fluorinated alcohol is a sodium alcoholate.

9. The method of making hexyl di-2,2,3,3,4,4,4-heptafluorobutyl phosphate which comprises reacting an aqueous solution of sodium heptafluorobutyl alcoholate with hexyl phosphoryl dichloride and thereby substituting a 2,2,3,3,4,4,4-heptafluorobutoxy radical for each of the two chlorine atoms of said hexy phosphoryl dichloride.

10. The method of making 2,2,3,3,4,4,4-heptafluorobutyl dibutyl phosphate which comprises reacting an aqueous solution of sodium heptafluorobutyl alcoholate with dibutyl phosphoryl chloride and thereby substituting a 2,2,3,3,4,4,4-heptafluorobutoxy radical for the chlorine radical for said dibutyl phosphoryl chloride.

11. A new chemical compound represented by the formula $$\begin{array}{c} R' \\ | \\ O \\ \| \\ R-O-P=O \\ | \\ O \\ | \\ R'' \end{array}$$

in which R is a member of the group consisting of an alkyl radical terminating with a CH₂ group and having from 1 to 10 carbon atoms and an alkoxyalkyl radical terminating in a CH₂ group having from 3 to 10 carbon atoms and having at least 2 carbon atoms in the alkyl portion thereof; R' is a member of the group consisting of a fluorinated alkyl radical having from 2 to 10 carbon atoms and having a per-fluorinated carbon atom with at least 2 fluorine atoms and said carbon atom bonded to the carbon atom connected to an oxygen of the phosphate radical and the carbon bonded to the oxygen of the phosphate radical is bonded in addition to the bond to this oxygen only to atoms which are members of the group consisting of hydrogen and carbon and a fluorinated alkoxyalkyl radical containing from 3 to 10 carbon atoms with at least 2 carbon atoms in the alkyl portion thereof and having a fluorinated carbon atom with at least 2 fluorine atoms bonded to the carbon atom connected to an oxygen of the phosphate radical and the carbon bonded to the oxygen of the phosphate radical is bonded in addition to the bond to this oxygen only to atoms which are members of the group consisting of hydrogen and carbon; and R'' is a member of the group consisting of an alkyl radical terminating with a CH₂ group and having from 1 to 10 carbon atoms, an alkoxyalkyl radical terminating in a CH₂ group having from 3 to 10 carbon atoms and having at least two carbon atoms in the alkyl portion thereof, a fluorinated alkyl radical having from 2 to 10 carbon atoms and having a per-fluorinated carbon atom with at least 2 fluorine atoms and said carbon atom bonded to the carbon atom connected to an oxygen of the phosphate radical and the carbon bonded to the oxygen of the phosphate radical is bonded in addition to the bond to this oxygen only to atoms which are members of the group consisting of hydrogen and carbon, and a fluorinated alkoxyalkyl radical containing from 3 to 10 carbon atoms with at least 2 carbon atoms in the alkyl portion thereof and having a per-fluorinated carbon atom with at least 2 fluorine atoms and said carbon atom bonded to the carbon atom connected to an oxygen of the phosphate radical and the carbon bonded to the oxygen of the phosphate radical is bonded in addition to the bond to this oxygen only to atoms which are members of the group consisting of hydrogen and carbon.

12. A mixed fluorinated tri-alkyl phosphate having at least one fluorinated alkyl substituent having from 2 to 10 carbon atoms and having a per-fluorinated beta-carbon atom and at least one non-fluorinated alkyl substituent having from 1 to 10 carbon atoms.

13. A mono-fluoroalkyl dialkyl phosphate in which said fluoroalkyl radical has from 2 to 10 carbon atoms and having a per-fluorinated beta-carbon atom and said alkyl radicals have from 1 to 10 carbon atoms.

14. A di-fluoroalkyl monoalkyl phosphate in which said fluoroalkyl radicals have from 2 to 10 carbon atoms and having a per-fluorinated beta-carbon atom and said alkyl radical has from 1 to 10 carbon atoms.

15. Hexyl di(2,2,3,3,4,4,4-heptafluorobutyl) phosphate.

16. Di(n-butyl)2,2,3,3,4,4,4-heptafluorobutyl phosphate.

17. Butyl di(2,2,3,3,4,4,4-heptafluorobutyl) phosphate.

18. The method as defined in claim 1 in which said aqueous solution of alkali metal salt of fluorinated alcohol is formed in the presence of said phosphoryl chloride by reaction between alkali metal hydroxide and said fluorinated alcohol.

19. The method of making butyl di(2,2,3,3,4,4,4-heptafluorobutyl) phosphate which comprises reacting an aqueous solution of sodium heptafluorobutyl alcoholate with butyl phosphoryl dichloride and thereby substituting a 2,2,3,3,4,4,4-heptafluorobutoxy radical for each of the two chlorine atoms of said butyl phosphoryl.

References Cited in the file of this patent

UNITED STATES PATENTS

| | | |
|---|---|---|
| 2,451,375 | Bell | Oct. 12, 1948 |
| 2,552,325 | Kosolapoff | May 8, 1951 |
| 2,559,749 | Benning | July 10, 1951 |

OTHER REFERENCES

Swarts: Rec. Trav. Chim., vol. 28, pp. 166 to 170 (1909).

Saunders: J. Chem. Soc. (London), 1948, pp. 699–701.